US012559194B2

(12) United States Patent
Fischer et al.

(10) Patent No.: US 12,559,194 B2
(45) Date of Patent: Feb. 24, 2026

(54) BICYCLE COMPRISING A STEERING UNIT

(71) Applicant: Porsche eBike Performance GmbH,
Ottobrunn (DE)

(72) Inventors: Dennis Fischer, Hirschhorn (DE);
Mikel Fauri, Ludwigsburg (DE);
Stefan Bender, Loechgau (DE)

(73) Assignee: Porsche eBike Performance GmbH,
Ottobrunn (DE)

( * ) Notice: Subject to any disclaimer, the term of this
patent is extended or adjusted under 35
U.S.C. 154(b) by 0 days.

(21) Appl. No.: 18/993,549

(22) PCT Filed: Jul. 11, 2023

(86) PCT No.: PCT/EP2023/069216
§ 371 (c)(1),
(2) Date: Jan. 11, 2025

(87) PCT Pub. No.: WO2024/013187
PCT Pub. Date: Jan. 18, 2024

(65) Prior Publication Data
US 2026/0028086 A1      Jan. 29, 2026

(30) Foreign Application Priority Data
Jul. 14, 2022    (DE) ..................... 10 2022 117 596.0

(51) Int. Cl.
*B62K 23/02*      (2006.01)
*B62K 21/12*      (2006.01)

(52) U.S. Cl.
CPC .............. *B62K 23/02* (2013.01); *B62K 21/12*
(2013.01)

(58) Field of Classification Search
None
See application file for complete search history.

(56) References Cited

U.S. PATENT DOCUMENTS 9,378,643 B2 *   6/2016   Huelsen ............ G08G 1/09626
9,771,122 B1     9/2017   Felicilda

FOREIGN PATENT DOCUMENTS

| DE | 102012212787 A1 * | 1/2014 | ............ B62K 21/26 |
| DE | 102018214252 | 2/2020 | |
| DE | 102019124242 | 3/2021 | |
| EP | 3409553 | 12/2018 | |
| TW | 202017786 | 5/2020 | |

* cited by examiner

*Primary Examiner* — Vicky A Johnson
(74) *Attorney, Agent, or Firm* — Gerald E. Hespos;
Michael J. Porco

(57) ABSTRACT

A steering unit (1) is provided for a bicycle (2), in particular
for an electric bicycle, and a bicycle (2) equipped with the
steering unit (1) also is provided. The steering unit (1) has
handle bars (3) for connecting the steering unit (1) to the
bicycle (2). At least one handle (4) is arranged and/or formed
on the handle bars (3) for gripping with a hand. Operating
safety of the bicycle (2) is improved by providing the
steering unit (1) with at least one photonic mixer device (6)
for detecting finger positions of the hand gripping the handle
(4).

10 Claims, 1 Drawing Sheet

BICYCLE COMPRISING A STEERING UNIT

FIELD OF THE INVENTION

The invention relates to a steering unit for a bicycle, in particular for an electric bicycle. The invention also relates to a bicycle equipped with a steering unit of this kind.

BACKGROUND OF THE INVENTION

A bicycle comprising a steering unit is known, for example, from DE 10 2018 214 252 A1. The steering unit of DE 10 2018 214 252 A1 has handlebars for connecting the steering unit to a bicycle and also has at least one handle that is formed or arranged on the handlebars, for being grasped by a hand of a rider. The handle of the known steering unit is equipped with a touch-sensitive sensor area that is configured to operate a brake and a transmission.

DE 10 2012 212 787 A1 discloses motorcycle handlebars in which at least one handle is monitored by optical sensors. During riding, predefined gestures that the rider makes with individual fingers of the hand gripping the handle are identified, so that the commands associated with the respective gesture can then be executed. For example, the rider can control an external navigation device or a smartphone in this way.

EP 3 409 553 B1 discloses a motorcycle that is equipped with a system that determines possible riding maneuvers depending on the situation and presents the rider with the riding maneuvers to choose from by means of haptic, but contactless, indication. The maneuver then selected by gesture control is executed by suitable actuators.

Further motorcycles with gesture control are known from TW 202 017 786 A and from DE 10 2019 124 242 A1.

The present invention relates to a steering unit of the kind described above or to a bicycle equipped with a steering unit. The steering unit disclosed herein is distinguished by increased riding reliability in conjunction with reduced wear of components of the bicycle.

SUMMARY OF THE INVENTION

The present invention is based on the general idea of using at least one photonic mixer device to sense finger positions of the hand grasping the handle. A photonic mixer device of this kind can also be referred to as a photonic mixer sensor or PMD sensor, where PMD stands for photonic mixing device. A PMD sensor is an optical sensor, the functional principle of which is based on the time-of-flight method. In this respect, a PMD sensor generally also corresponds to what is known as a TOS sensor, where TOS stands for Time of Flight. In a PMD sensor, the object to be sensed or to be detected is illuminated by light pulses, with the respective object reflecting these light pulses and the reflected light pulses being detected by the PMD sensor. On account of the time of flight, the distance between the PMD sensor and the respective object can be calculated. The light used by the PMD sensor preferably lies in the infrared range. PMD sensors are independent of the other illumination of the respective object and as a result are insensitive to glare and stray light and also function in the dark.

Given a corresponding resolution of the PMD sensor, individual subregions can also be detected individually within the respective object. In the present invention, the PMD sensor monitors the fingers of the respective hand, and in some embodiments the fingers can be monitored individually or separately. Therefore, the finger positions of each individual finger can be sensed in accordance with some embodiments. In the steering unit presented here, the respective photonic mixer device monitors at least one finger of the respective hand, and can sense different finger positions of this finger. However, the respective photonic mixer device preferably monitors at least two fingers of the respective hand. The photonic mixer device can monitor precisely two or three or four or all five fingers of the respective handr to sense the finger positions of the fingers, depending on the positioning and design.

Gesture control can be implemented by way of finger positions. Thus, components of the bicycle can be actuated manually, but contactlessly, thereby significantly reducing wear of these components. At the same time, the rider can leave the respective hand on the handle, so that the rider can always reliably control the bicycle.

The steering unit can expediently have at least one manually actuable brake lever arranged on the handlebars. The respective brake lever serves to actuate a brake system arranged on the bicycle. In accordance with one advantageous embodiment, the respective photonic mixer device can now be arranged in or on the respective brake lever. Owing to this positioning of the photonic mixer device on the brake lever, the respective handle can be monitored particularly easily to sense the finger positions of the hand grasping the handle.

A bicycle according to the invention comprises a frame, preferably two wheels, at least one electrically controllable component and a steering unit of the kind described above. Furthermore, the bicycle can be equipped with a control device that is coupled electrically to the respective photonic mixer device and to the respective component. The control device may be configured to control the respective components depending on the finger positions. In this way, for example, gesture control can be implemented to be able to contactlessly actuate the respective component.

In the present context, a "configuration" corresponds to a "design and/or programming", and therefore the wording "configured" is equivalent to the wording "designed and/or programmed".

According to one advantageous embodiment, the bicycle can have at least two different electrically controllable components, both of which are electrically coupled to the control device. The control device can then be configured to control these different components separately depending on the finger positions. In particular, different finger positions are identified in this way and are assigned to the different components. Accordingly, a first component can be controlled by way of first finger positions, while a second component can be controlled by way of second finger positions. The same applies to each further component.

Some embodiments of the control device are configured to compare a time profile of the finger positions with predetermined finger gestures, and different finger gestures are assigned to the various components in some embodiments. The control device also is configured to control the components separately depending on the finger gestures. Particularly simple, in particular intuitive, operator control of the respective components of the bicycle is possible as a result.

An electrical component of one embodiment is an electrically actuable transmission with several gears. The control device can then be configured to control the transmission, for the purpose of selecting the gears, depending on the finger positions. For example, lifting and lowering the index finger can be interpreted as a finger gesture for shifting to the next higher gear. In contrast, lifting and lowering the thumb of the respective hand can be interpreted as a finger gesture for shifting to the next lower gear.

According to another embodiment, the bicycle can be an electric bicycle and can have an electromotive drive with several different operating modes. The control device can then be configured to control the drive for the purpose of switching on and switching off and/or for the purpose of selecting the operating modes, depending on the finger positions. In principle, similar or even the same finger gestures are conceivable here as described above for the transmission, but expediently different hands can be assigned to the fingers. For example, the steering unit can have two handles and two photonic mixer devices. Thus, for example, the fingers of the right hand can be used for actuating the transmission, while the fingers of the left hand can be used for controlling the drive. In the present context, an electric bicycle may be understood to mean a bicycle in which the electromotive drive serves only to assist the rider who drives the bicycle using pedals for this purpose. In this respect, the electric bicycle is preferably what is known as a pedelec or speedelec.

Another embodiment relates to bicycle that has as an electrical component that comprises an electrical lighting means with several lighting modes. The control device can then be configured to control the lighting device for the purpose of switching on and switching off the lighting means and/or for the purpose of selecting the lighting modes, depending on the finger positions. Convenience can also be considerably increased in this way.

According to another embodiment, the bicycle can be equipped with an electric brake system, and at least one manually actuable brake lever can be arranged on the handlebars. The respective photonic mixer device can then be arranged on or in the respective brake lever. The control device can particularly expediently then be configured to control the brake system depending on a relative position between the handle and the brake lever, in particular depending on a distance between the handle and the brake lever. For braking purposes, the rider has to manually actuate the respective brake lever. The finger positions can be detected by the photonic mixer device. In any case, the photonic mixer device can detect the relative position, preferably the distance, between the brake lever and the handle at least when at least one finger for actuating the brake lever lifts off from the handle. Thus, it is possible for the control device to actuate the brake system depending on the relative position between the brake lever and the handle or depending on the distance between the handle and the brake lever. Therefore, a wired or hydraulic coupling between the brake lever and the brake system can be dispensed with. Detection of the distance between the brake lever and the handle as a relative position between the brake lever and the handle is appropriate particularly when the photonic mixer device is arranged on or in the inside of the handle.

Further important features and advantages of the invention can be gathered from the dependent claims, from the drawings and from the associated description of figures on the basis of the drawings.

It is self-evident that the features mentioned above and those which are yet to be explained can be used not only in the respectively specified combination but also in other combinations or on their own, without departing from the scope of the present invention. Constituent parts of a higher-level unit, such as for example a device, an apparatus or an arrangement, which are mentioned above or are yet to be mentioned below and are separately designated may form separate component parts or components of this unit or may be integral regions or sections of this unit, even if this is shown differently in the drawings.

Preferred exemplary embodiments of the invention are shown in the drawings and will be explained in more detail in the following description, with identical reference signs denoting identical or similar or functionally identical components.

DETAILED DESCRIPTION

Figure 1:
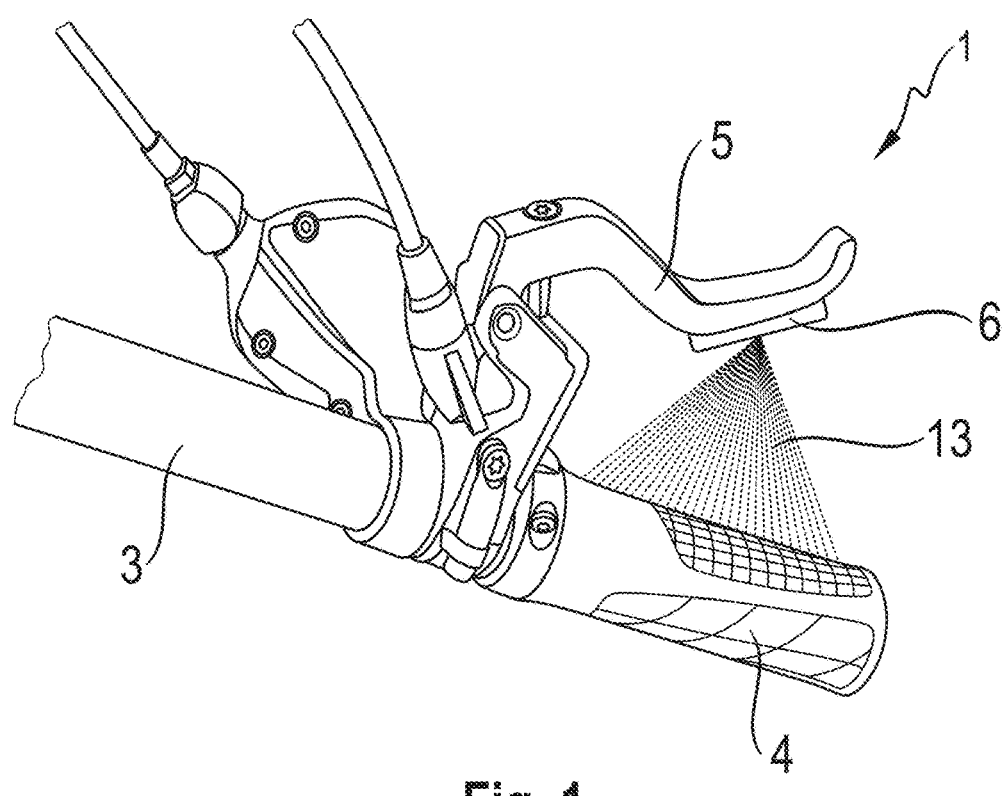
FIG. 1 is a perspective view of a steering unit in a region of a handle.

FIG. 1 is a perspective view of a steering unit 1 for a bicycle 2. The bicycle 2 is indicated schematically by the frame drawn using a dash-and-dot line in FIG. 2 and comprises handlebars 3, which serve to connect the steering unit 1 to the bicycle 2. At least one handle 4 is located on the handle bars 3 and can be grasped by a hand of the respective rider. It is clear that the steering unit 1 usually has two handles 4. Only the region of the steering unit 1 with the right-hand-side handle 4 is representatively shown in FIG. 1. The handle 4 can be formed directly by an end portion of the handlebars 3. The respective handle 4 is preferably a separate component part that is arranged on the respective end portion of the handlebars. For example, the separate handle 4 can be fitted onto the respective end portion of the handlebars in the manner of a sleeve.

The steering unit 1 is equipped with at least one manually actuable brake lever 5 attached to the handlebars 3. A respective brake lever 5 is preferably assigned to each handle 4. The brake levers 5 are, in particular mechanically or hydraulically or electrically, coupled to a brake system of the bicycle 2 that not shown in any detail here.

The steering unit 1 also is equipped with at least one photonic mixer device 6 that senses the finger positions of the hand grasping the handle. At least one such photonic mixer device 6 is expediently assigned to each handle 4, so that the finger positions of both hands can be sensed. In the example shown here, the respective photonic mixer device 6 is arranged on the respective brake lever 5, specifically on an inner side facing the respective handle 4. It is likewise conceivable to integrate the respective photonic mixer device 6 into the respective handle 5 on this inner side. The integrated photonic mixer device 6 then does not form any interfering contour on the respective brake lever 5.

Figure 2:
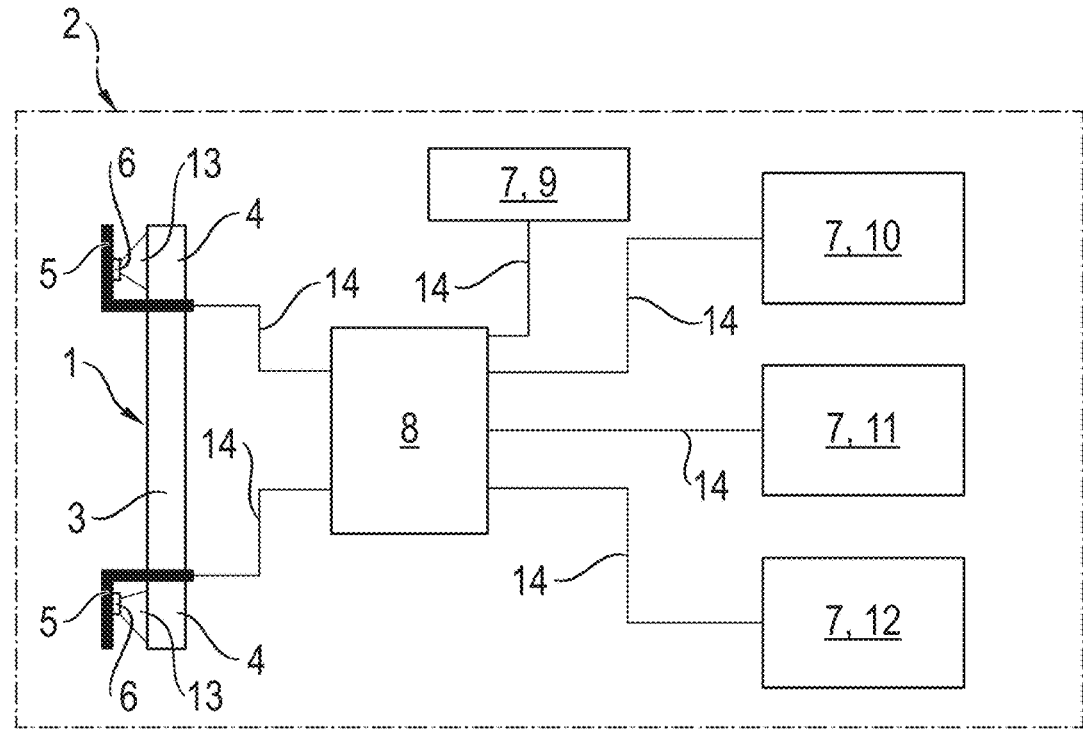
FIG. 2 is a highly simplified illustration of a circuit diagram of a bicycle equipped with the steering unit.

In accordance with FIG. 2, the bicycle 2 comprises, in addition to the steering unit 1, at least one electrically controllable component 7 and also a control device 8 that is coupled electrically to the respective photonic mixer device 6 and also to the respective component 7. The control device 8 can be configured to control the respective component 7 depending on the finger positions. The bicycle 2 can have two or more different electrically controllable components 7. Without restricting the generality, FIG. 2 indicates, purely by way of example, four such components 7 that can be actuated or controlled by different finger positions, in particular by different finger gestures. For this purpose, in particular finger positions and/or finger gestures of the fingers of the left hand can differ from finger positions or finger gestures of the right hand. Finger gestures can be determined, in particular, by a time profile of the finger positions and compared with predetermined finger gestures stored in the control device 8.

Possible electrical components 7 include, for example, an electrically actuable transmission 9, an electromotive drive 10, an electrical lighting means 11 and an electrical brake system 12. The control device 8 can be configured such to control the transmission 9 depending on the finger positions or finger gestures for selecting the gears, that is to say the respective transmission ratio. In addition or as an alternative, the control device can be configured to switch on or switch off the drive 10 depending on the finger positions or, when the drive 10 is switched on, activates the drive for the purpose of selecting one of several operating modes. In addition or as an alternative, the control device 8 can be configured to switch on or switch off the electrical lighting means 11 depending on the finger positions and/or, when the lighting means 11 is switched on, activates the lighting means for the purpose of selecting one of several lighting modes. In addition or as an alternative, the control device 8 can be configured to control the brake system 12 depending on a distance between the handle 4 and the brake lever 5. Provision may expediently be made for a decreasing distance between the handle 4 and the brake lever 5 to correspond to an increasing brake pressure.

FIGS. 1 and 2 also indicate a detection region 13 of the respective photonic mixer device 6. In order to sense the finger positions of the hand grasping the handle 4, this detection region 13 is aligned with the respective handle 4. If the handle 4 is not covered by all fingers of the respective hand, the photonic mixer device 6 can also detect the distance between the brake lever 5 and the handle 4 in addition to sensing the finger positions. At least the rider who wishes to actuate the respective brake lever 5 has to take at least one finger off the handle 4 for this purpose, and therefore the photonic mixer device 6 can measure the distance between the brake lever 5 and the handle 4 there.

In FIG. 2, the photonic mixer devices 6 and the controllable components 7 are coupled to the control device 8 via corresponding connecting lines 14. As an alternative to such wired coupling, wireless coupling is also conceivable in principle.

The invention claimed is:

1. A steering unit (1) for a bicycle (2), comprising: handlebars (3) for connecting the steering unit (1) to a bicycle (2); at least one handle (4) formed and/or arranged on the handlebars (3) and configured for being grasped by a hand; and at least one photonic mixer device (6) for sensing finger positions of the hand grasping the handle (4).

2. The steering unit (1) of claim 1, wherein the steering unit (1) has at least one manually actuable brake lever (5); arranged on the handlebars (3), and the respective photonic mixer device (6) is arranged in or on the respective brake lever (5).

3. A bicycle (2) comprising: at least one electrically controllable component (7); a steering unit (1) having handlebars (3) connecting the steering unit (1) to the bicycle (2); at least one handle (4) formed and/or arranged on the handlebars (3) and configured for being grasped by a hand; at least one photonic mixer device (6) for sensing finger positions of the hand grasping the handle (4); and a control device (8) that is electrically coupled to the steering unit (1) and to the respective component (7) and that is configured such that the control device (8) controls the respective component (7) depending on the finger positions.

4. The bicycle (2) of claim 3, the at least one electrically controllable component comprises at least two different electrically controllable components (7), both of which are electrically coupled to the control device (8), and the control device (8) controlling the electrically controllable components (7) separately depending on the finger positions.

5. The bicycle (2) of claim 4, wherein the control device (8) is configured to compare a time profile of the finger positions with predetermined finger gestures, different finger gestures being assigned to the different components (7), and the control device (8) being configured to control the components (7) separately depending on the finger gestures.

6. The bicycle (2) of claim 3, wherein the at least one electrical component (7) includes an electrically actuable transmission (9) with several gears, and the control device (8) controls the transmission (9) for selecting the gears, depending on the finger positions.

7. The bicycle (2) of claim 3 wherein the bicycle (2) is an electric bicycle and has an electromotive drive (10) with several different operating modes, and the control device (8) is configured to control the drive (10) for switching on or switching off the drive (10) and/or for selecting the operating modes, depending on the finger positions.

8. The bicycle (2) of claim 3, wherein the at least one electrically controllable component (7) includes an electrical lighting means (11) with several lighting modes, and the control device (8) is configured to control the lighting means (11), for switching on or switching off and/or for the purpose of selecting the lighting modes, depending on the finger positions.

9. The bicycle (2) of claim 3, wherein the at least one electrically controllable component (7) comprises an electrical brake system (12) that has at least one brake lever (5) attached to the handlebars (3) in the region of the respective handle (4), the respective photonic mixer device (6) being arranged to detect a relative position between the brake lever (5) and the handle (4), and the control device (8) is configured to control the brake system (12) depending on the relative position between the brake lever (5) and the handle (4).

10. The bicycle (2) of claim 9, wherein the at least one photonic mixer device (6) is arranged to detect a distance between the brake lever (5) and the handle (4) as the relative position between the brake lever (5) and the handle (4).

* * * * *